United States Patent
Milne et al.

(10) Patent No.: US 7,536,377 B1
(45) Date of Patent: *May 19, 2009

(54) COMPONENT NAMING

(75) Inventors: Roger B. Milne, Boulder, CO (US);
Jeffrey D. Stroomer, Lafayette, CO (US)

(73) Assignee: Xilinx, Inc., San Jose, CA (US)

( * ) Notice: Subject to any disclaimer, the term of this patent is extended or adjusted under 35 U.S.C. 154(b) by 469 days.

This patent is subject to a terminal disclaimer.

(21) Appl. No.: 10/740,781

(22) Filed: Dec. 18, 2003

(51) Int. Cl.
*G06F 7/00* (2006.01)
*G06F 17/30* (2006.01)
(52) U.S. Cl. .............. 707/2; 711/170; 703/14
(58) Field of Classification Search .......... 707/1–10, 707/100–104.1, 200–206; 717/101–108; 711/170, 113, 130–133, 137; 703/14–16; 716/17–18, 11, 4–5
See application file for complete search history.

(56) References Cited

U.S. PATENT DOCUMENTS

| | | | |
|---|---|---|---|
| 5,592,392 A * | 1/1997 | Matheson et al. ............. 716/11 |
| 5,909,695 A | 6/1999 | Wong et al. |
| 5,991,788 A * | 11/1999 | Mintzer ....................... 708/622 |
| 6,243,851 B1 * | 6/2001 | Hwang et al. ................. 716/10 |
| 6,297,666 B1 * | 10/2001 | Weingartner et al. .......... 326/41 |
| 6,529,913 B1 | 3/2003 | Doig et al. |
| 6,539,520 B1 | 3/2003 | Tiong et al. |
| 6,654,936 B2 | 11/2003 | McBride |
| 6,658,630 B1 | 12/2003 | Threatt et al. |
| 7,124,243 B2 | 10/2006 | Burton et al. |
| 2003/0140051 A1 * | 7/2003 | Fujiwara et al. ............. 707/100 |

OTHER PUBLICATIONS

Graefe et al., Sort vs. hash revisited, Dec. 1994, IEEE, vol. 6, 934-944.*
Wolf et al., A parallel hash join algorithm for managing data skew, Dec. 1993, IEEE, vol. 4, 1355-1371.*
U.S. Appl. No. 10/741,977, filed Dec. 18, 2003, Stroomer et al.

* cited by examiner

*Primary Examiner*—Jean B Fleurantin
(74) *Attorney, Agent, or Firm*—W. Eric Webostad

(57) ABSTRACT

Method and apparatus for component naming is described. Parameters (305) for a target component are obtained (201). The parameters (305) are hashed (202) to provide a hash value (203). The hash value (203) is used to construct a name (205) of the target component.

9 Claims, 5 Drawing Sheets

COMPONENT NAMING

FIELD OF THE INVENTION

One or more aspects of the invention relate generally to component naming and more particularly, to component naming using hash values.

BACKGROUND OF THE INVENTION

Today, complex integrated circuits are sometimes designed in software, and then translated from a software description into a hardware description. Two software tools are typically used to do this translation, namely, a "component generator" and a "netlister".

A component generator is a mechanism that, when given parameters describing an electronic component, generates a version of the component itself. Examples of components that might be generated include multipliers, finite impulse response (FIR) filters, counters, and fast Fourier transforms (FFTs). The parameters specify the characteristics the component should have. For example, if the component is to be a multiplier, the parameters might specify the latency, maximum width, and the algorithm to be employed. The CoreGen tool, supplied by Xilinx, Inc. of San Jose, Calif., is an example of a component generator.

A netlister is a mechanism that translates portions of an electronic design from a high-level representation into a lower-level one. For example, in the high-level modeling system known as System Generator from by Xilinx, Inc. of San Jose, Calif., a netlister is employed to translate user designs into VHDL. The job of translation is often split between a netlister and a component generator. In System Generator, for example, some translation is done by CoreGen, and the remainder is done by the System Generator netlister.

Use of component generators is widespread, as they simplify the job of generating complicated or large components. However, component generators may be slow and use a substantial amount of memory.

The relatively long execution time and high memory cost of component generators is due in part to the size and complicated nature of some components. Continuing the example of multipliers, there are many algorithms from which to select and many parameters to specify to arrive at a particular multiplier. Moreover, a large multiplier can be complicated and require many connections.

The set of all possible configurations of a component is often enormous, making it impractical to provide compiled versions of every possible combination. An individual designer, however, often uses the same component configuration more than once. Conventionally, each use of a generated component involves a compilation, even if the component has previously been compiled.

Another problem contributing to long running times for component generators is the number of components in a design. Designs are becoming more complicated, and conventional software tools for implementing complex designs may have difficulty or be limited in the size of design they can handle due at least in part to the volume of compilation to be done. Users may use the same component in multiple locations in a design. In practice, this may be done by copying and pasting a component from one logic block into another logic block. However, this means that the same component is compiled more than once. This redundancy in compilation may be a limiting factor with respect to design size, as well as cause an increase in compilation time.

In large electronic designs, portions of the design may have been replicated many times with only minor variations. Classically, a netlister generates a separate Hardware Description Language ("HDL") object (e.g., a VHDL entity or Verilog module) for each copy, even though it may be possible to reuse a previously generated object. There would be a substantial advantage to reusing HDL objects, because reuse would reduce run time and memory requirements of downstream tools such as synthesis engines.

Accordingly, it would be desirable and useful to allow a component generator to recognize when a component has been previously generated so it can be reused. Additionally, it would be desirable and useful to allow a netlister to recognize when a previously generated HDL object can be reused.

SUMMARY OF THE INVENTION

An aspect of the invention is a method for component naming. Parameters for a target component are obtained. At least a portion of the parameters are hashed to provide a hash value, and the hash value is used to construct a name of the target component.

Another aspect of the invention is a data structure including a hash value representing a hash of parameters describing a component, and a directory name including the hash value.

Another aspect of the invention is an apparatus for generating a component name, comprising: a compiler designed to receive component parameters and configured to arrange the component parameters in a canonical format; and a hash generator designed to receive the component parameters in the canonical format and configured to provide a hash value responsive to the component parameters received.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Figure 1:
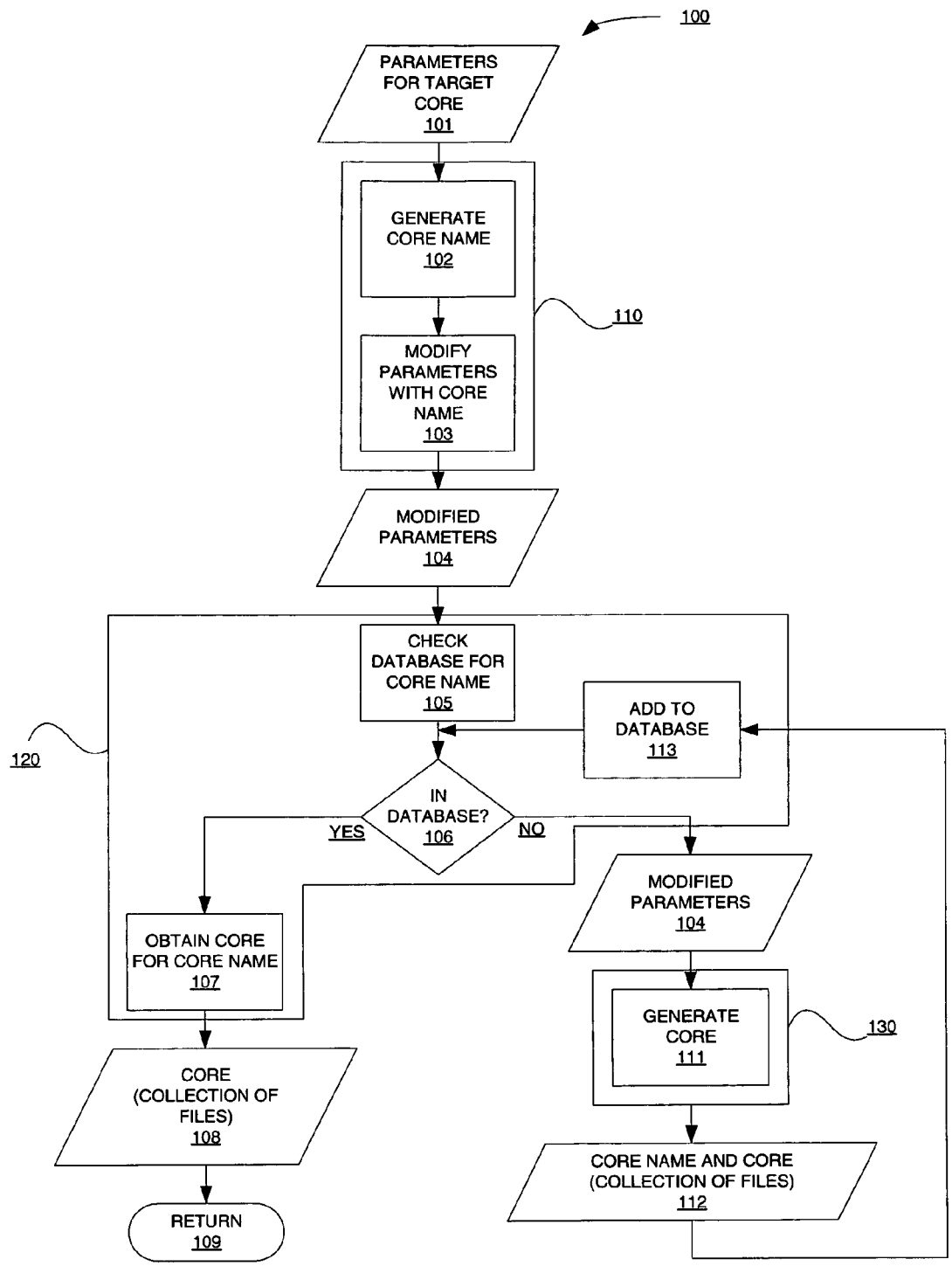
FIG. 1 is a flow diagram depicting an exemplary embodiment of a component reuse flow for a component generator.

FIG. 1 is a flow diagram depicting an exemplary embodiment of a component reuse flow 100 for a component generator. A user provides parameters 101 for a target component or core. At least a portion of parameters 101 are provided to core name generator ("namer") 110, which in response generates a name for a target core at 102. At 103, namer 110 modifies parameters 101 with the name generated at 102.

Figures 2, 3:
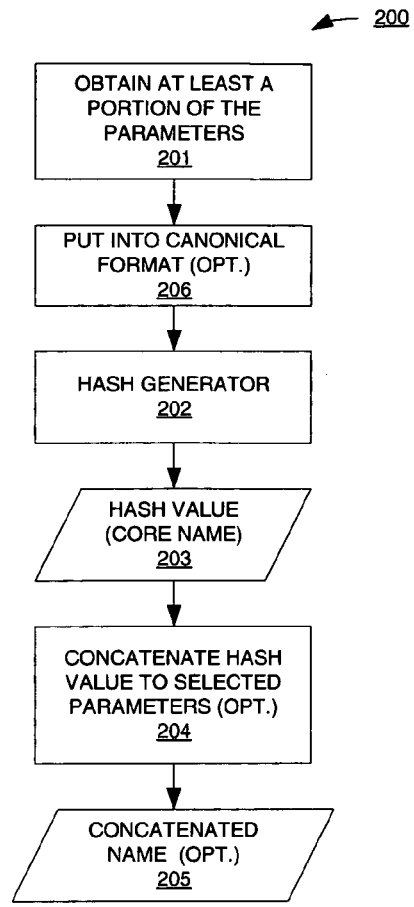
FIG. 2 is a flow diagram depicting an exemplary embodiment of a core name generation flow.
FIG. 3 is a portion of an exemplary embodiment of a parameter listing for a multiplier for instantiation in a field programmable gate array ("FPGA").

FIG. 2 is a flow diagram depicting an exemplary embodiment of a core name generation flow 200. All or a portion of core name generation flow 200 may be used by namer 110 (shown in FIG. 1) to provide a core name 103. At least a portion of parameters 101 (shown in FIG. 1) are obtained at 201. These obtained parameters are provided to a hash generator at 202.

Any of a variety of well-known hash functions may be used for hash generation. Examples of hash functions include Matyas-Meyer-Oseas ($2^{\wedge}(2/n)$ collision resistance), MDC-2 with DES ($2*(2^{\wedge})$ collision resistance), MDC-4 with DES ($4*(2^{\wedge}54)$ collision resistance), Merkle with DES ($2^{\wedge}56$ collision resistance), MD4 ($2^{\wedge}20$ collision resistance), MD5 ($2^{\wedge}64$ collision resistance), RIPEMD-128 ($2^{\wedge}64$ collision resistance), SHA-1 ($2^{\wedge}80$ collision resistance), and RIPEMD-160 ($2^{\wedge}80$ collision resistance), among others, where n-bit message blocks are used to produce m-bit hash values. Notably, a hash function may be chosen in association with the degree of reliability desired to avoid collision. For example, a bit change in the input will result in significant change in the output when using MD5.

Notably, a hash generator having a sufficiently high collision resistance, namely, a collision resistant hash function ("CRHF"), may be employed. Output of hash generator 202 is a "hash value" 203. This "hash value" output is at least part of a core name 203, and might constitute the entire name. Names are formed in such a way that cores having different hash values are essentially guaranteed to have different names. Use of a collision-resistant hash function makes it highly likely that two cores assigned the same name are, in fact, the same. "Hash value" may alternatively be referred to as a "hash code," a "hash result," or simply a "hash."

Optionally, at 204, a name may be added to selected parameters. For example, hash value 203 may be concatenated at 204 with selected parameters of parameters 101 (shown in FIG. 1) to provide a core name. Thus, optionally, a concatenation of a hash value and more easily recognizable parameters may be output as a core name 205.

Returning to FIG. 1, at 103, parameters 101 are modified with a core name. Modified parameters 104 are provided as input to a cache manager 120.

FIG. 3 is a portion of an exemplary embodiment of a parameter listing 300 for a multiplier for instantiation in a field programmable gate array ("FPGA"). Notably, parameter listing 300 is merely an example, and there are many other known parameterized listings for multipliers, as well as other types of cores. Furthermore, though a programmable logic device, namely, an FPGA, is used in this example for instantiation of a design, non-programmable logic may be designed using this technology. For example, Application Specific Standard Products ("ASSPs"), Application Specific Integrated Circuits ("ASICs"), processors and other known types of integrated circuits may use this technology.

Parameter listing 300 includes SET instructions 304, GENERATE instruction 307, SELECT instruction 306, and CSET instructions 305. CSET component_name instruction is a setting for a core name 301. Core name 301 is generated, at least in part, from a hash of at least a portion of the parameters used for parameter listing 300. Employing a collision resistant hash function makes it unlikely that different sets of parameters will "collide", i.e., produce the same hash value. The likelihood of a collision can be made arbitrarily small by increasing the number of bits that the hash function produces in hash values.

Because component name 303 is constructed from a hash value that is generated from core parameters, component name 303 cannot be used when generating a hash value from parameters.

Component generators are often insensitive to minor variations in the parameters that specify a core. For example, reordering the instructions that specify the characteristics of a core is unlikely to change the core that is generated. Such variations, however, will cause the hash value that is produced from the parameters to change. For this reason, it is worthwhile to put parameters into a canonical form at 206 of FIG. 2. If parameters are not put in a canonical form, opportunities to reuse components may be overlooked. In the example, putting parameters into canonical form may be accomplished by sorting CSET instructions, making sure that no lines start or end with white space, and reducing every remaining string of white space to a single blank.

Parameter listing 300 is used to generate a core where hash value 303 is used as a core name. Netlists may depend upon core names for instantiating circuits. Furthermore, a downstream software processing tool, such as a VHDL or Verilog synthesis tool, may depend upon core names for directory names for instantiating circuits.

Hash value 303 may be a binary or hexadecimal string, and therefore may be difficult for a human to interpret. To address this potential difficulty, information from parameter listing 300 may optionally be appended to hash value 303 when forming the core name. For example, information 302 from SELECT instruction 306 may be appended to hash value 303 to form a core name 301 having descriptive text.

It should be understood that a client application looking for a target core submits a parameterized listing for the target core. Notably, parameters selected for generating a hash value may be the same in each instance to ensure that same parameters are identified to a unique hash value, which thereby identifies a particular core.

The above example is just one embodiment for forming a core name. However, other embodiments for forming core names may be used. For example, another way to form core names is by concatenating most or all of the parameters used to define the core. In practice, however, this approach is likely to produce an extremely long name, possibly making it unusable as a directory name, and possibly violating name length restrictions imposed by HDL compilers. Moreover, a name formed in such a way is unlikely to conform to the rules governing HDL names. For example, names in VHDL must consist of letters, digits, and underscores, must start with a letter, cannot end with an underscore, and cannot contain two underscores in a row. These restrictions might be avoided by employing an algorithm to adjust names after concatenation, but then two cores having different parameters may, in the end, be assigned the same name.

Returning to FIG. 1, recall that modified parameters 104 are provided to cache manager 120. At 105, a check of a database for core names is made. If the core name in modified parameters 104 is in the database at 106, then the cached core 108 matching the core name is accessed at 107 and provided to the client application at 109.

If, however, at 106 the core name from modified parameters 104 is not found in the database at 106, then modified parameters 104 are provided to core generator 130 for core generation in response to such modified parameters 104 at 111. Output 112 of core generator 130, namely, a collection of compiled files for the target core in association with the core name having a hash value, may be returned to cache manager 120 for inclusion in the database of core names at 113. Notably, for an initial generation of a core 112, cores 108 and 112 are the same core in an iteration of component reuse flow 100. However, if core 108 has been previously generated, then core reuse is possible.

At 113, a core name from modified parameters 104 in association with core files is added to a database for core files ("cores"). For example, a directory whose name is identical to that of the core may be created, and core may be stored in the directory so created.

Core generator 130, like a high-level modeling system ("HLMS"), synthesizes or otherwise translates a high-level description of a design into a lower-level representation. This lower-level representation may be in a hardware description language ("HDL") or in a binary format.

A core is a collection of electronic files representing a component. Appearance of content of the files depends on the type of core generator being used. Generally, such files will be of a binary format or HDL. Examples of HDLs include VHDL, Verilog, and Electronic Design Interchange Format ("EDIF"; ASCII text). Examples of binary formats are ngc and ncd formats supplied by Xilinx, Inc. For purposes of clarity, the remainder of the description is in terms of HDLS, such as VHDL or Verilog, though other types of lower-level representations, such as binary files, as well as other types of HDLS, such as EDIFs, may be used. It should be appreciated that the description that follows is not dependent on a particular format of representation being used.

Within a file, there will generally be instances of entities, as in a VHDL netlist, or modules, as in a Verilog netlist. For VHDL or Verilog, such instances of entities or modules ("netlist instances") will have names including a hash value.

Because core names are assigned by namer 104 using a collision resistant hash function, there is a high likelihood that only cores having matching parameters will be accessed for reuse. For example, by using 64-bit hash values for a core cache containing 65,000 or fewer cores, the chance of collision is less than one in 10^9 with MD5. Though namer 104 assigns a core name, a user optionally has some ability to define the name by including text to be appended to a hash value of the parameters for the core.

Figure 4:
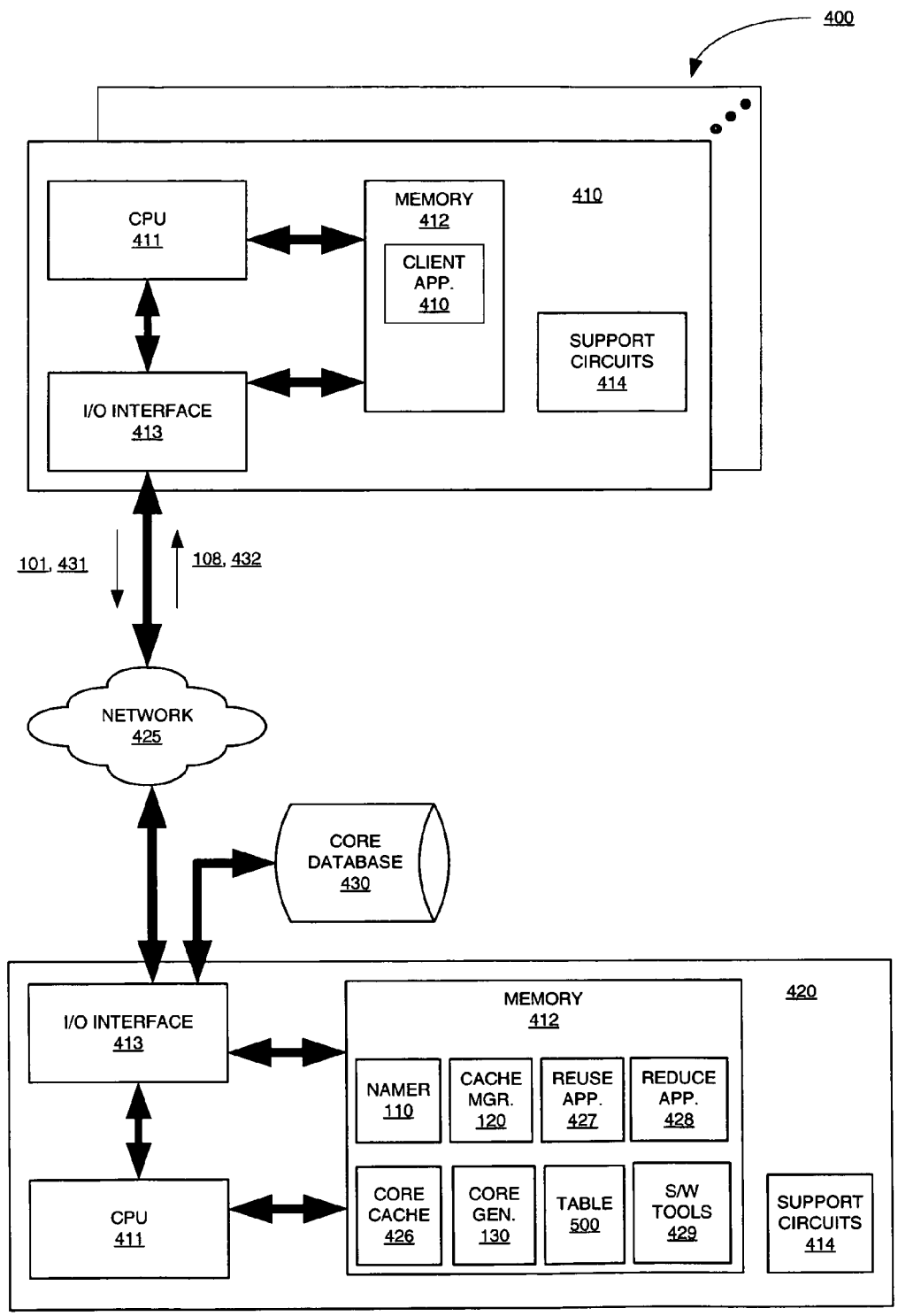
FIG. 4 is a network diagram depicting an exemplary embodiment of a client-server network.

Referring to FIG. 4, there is shown a network diagram depicting an exemplary embodiment of a client-server network 400. Client-server network 400 includes one or more client computers 410 and server computer 420. Each computer 410, 420 includes an input/output interface 413, central processing unit ("CPU") 411, memory 412 and support circuits 414. CPU 411 may be any type of microprocessor known in the art. Support circuits 414 for CPU 411 include conventional cache, power supplies, clock circuits, data registers, I/O interfaces, and the like. Memory 412 may be directly coupled to CPU 411 or coupled through I/O interface 413, and I/O interface may be coupled to a conventional keyboard, network, mouse, display printer, and interface circuitry adapted to receive and transmit data, such as data files and the like.

Computers 410 and 420 may be put in communication with one another via network 425. Additionally server computer 420 may be put in communication with core database 430. Core database 430 may be organized where directory names are names of cores, where each core name includes a hash value, and files in such directories are for the cores.

Memory 412 of client computer 410 may include a client application for sending parameters 101 for a target core to server computer 420 via network 425. In response to receipt of parameters 101, reuse application 427 generates a hash value. Reuse application 427 corresponds to component reuse flow 100 of FIG. 1, and thus memory 412 of server computer 420 may include namer 110, cache manager 120 and core generator 130. Core manager 120 may use cache memory to have a core cache 426.

Core cache 426 may be a list of core names already in core database 430, and this list of names may be read from a directory of names of core database 430 to reduce reads of core database 430, such as when a core is to be generated by core generator 130. Alternatively, core cache 426 may be omitted, and core database 430 may be read for a core name matching a directory name. Notably, to reduce the likelihood of same cores being stored in core database 430, hash values only may be used for directory searches, ignoring for example any optional appended text. Furthermore, it should be appreciated that textual or binary instructions may be used.

It should be appreciated that in a client-server environment, multiple clients can generate cores and thereby augment core database 430. Furthermore, libraries of cores may be populated in core database 430, where multiple users have access to such libraries of cores.

If core cache 426 is memory constrained, core names may be selected by random number generation, frequency of access, currency of access, currency of creation a combination of any or all of the above, or other criteria for deletion from core cache 426. Furthermore, if core database 430 is memory constrained, cores may be selected by random number generation, frequency of access, currency of access, currency of creation, compile time (expense) to create, a combination of any or all of the above, or other criteria for deletion.

A stand-alone system may be implemented, where memory 412 of a computer 420 may include an application 410. However, a server computer 420, which may have enhanced capability for hashing and compiling over a client computer 410 due to more than one processor or other internal performance enhancements, may be able more readily to produce cores than client computer 410.

Additionally, having cores accessed through a server computer 420, facilitates tracking of which cores are the more popular cores. Furthermore, a server computer 420 could be accessible among multiple clients, where client computers 410 are for different entities. Alternatively, because a uniform naming convention as described above may be employed, a user may generate a hash value for a set of parameters and then search using such hash value for a matching core. For example, rather than a client-server model, a shared directory may be used for sharing cores. Another approach to core sharing using hash values may involve core file swapping among entities, such as core file swapping over the Internet or an Intranet.

Figure 5:
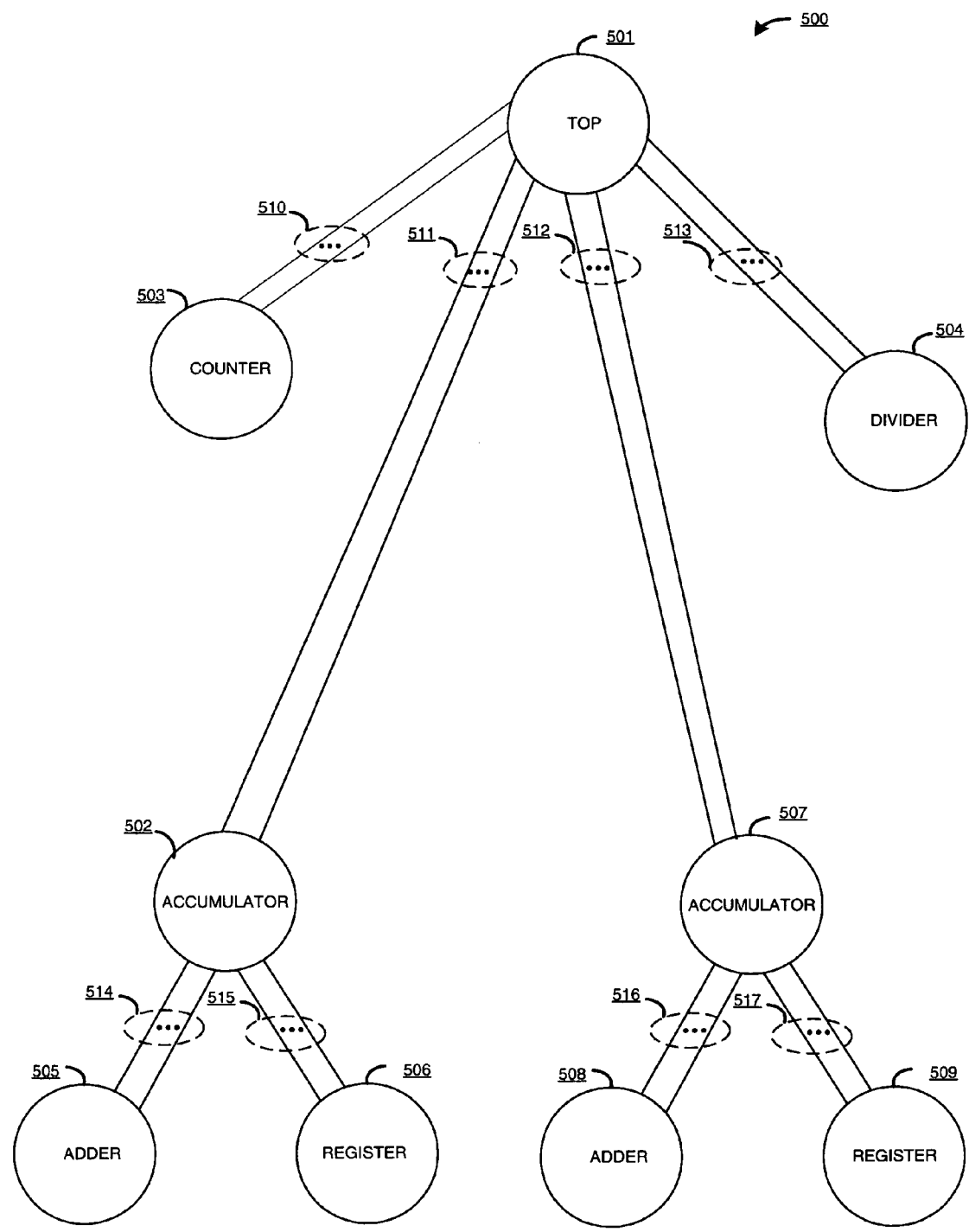
FIG. 5 is a tree diagram depicting an exemplary embodiment of an electronic design in a modeling system.

FIG. 5 is a tree diagram depicting an exemplary embodiment of an electronic design 500 in a modeling system. Such a modeling system may be a high-level modeling system, such as Xilinx's System Generator. As shown in the figure, a design is organized into levels of hierarchy. These levels are called "blocks". In FIG. 5, each of 501, 502, 503, 504, 505, 506, 507, 508, and 509 represents a block. Blocks may contain sub-blocks. For example, blocks 505 and 506 are "sub-blocks" or "children" of block 502, and block 502 is the "parent" of blocks 505 and 506. For example, blocks 508 and 509 are "sub-blocks" or "children" of block 507, and block 507 is the "parent" of blocks 508 and 509. This containment relation is represented by connections 510, 511, 512, 513, 514, 515, 516, and 517 in the figure.

A job of a netlister is to translate each block into a corresponding HDL object. For example, the netlister in System Generator translates blocks into VHDL entities. Commonly, a netlister translates children before translating parents; thus, for example, blocks 505 and 506 would be translated into HDL objects before block 502. Notably, though "TOP", "ACCUMULATOR", "COUNTER", "DIVIDER", "ADDER", "REGISTER", "ACCUMULATOR", "ADDER", and "REGISTER" are used for respective examples of blocks 501, 502, 503, 504, 505, 506, 507, 508, and 509, other well-known types of circuits may be used in addition to these, and furthermore one or more of these example circuits may be omitted.

Often, electronic designs are constructed by duplicating a portion of the design many times. The copies may be identical, or may differ in minor ways. For example, in FIG. 5, block 502 and its sub-blocks 505 and 506 may have been created by duplicating block another accumulator block and its adder and register sub-blocks. For example, ACCUMULATOR 507 and its sub-blocks 508 and 509 may have been created when a user duplicated ACCUMULATOR 502 and its sub-blocks 505 and 506, such as by copying and pasting. It is often possible and advantageous to use the same HDL object (e.g., VHDL entity or Verilog module) to represent duplicated portions. An advantage is the savings in processing time and memory requirements in downstream tools such as synthesis engines. It is, therefore, advantageous, to augment a netlister with a mechanism that simplifies the job of identifying duplicates and to translate duplicates to the same HDL object.

Figure 6:
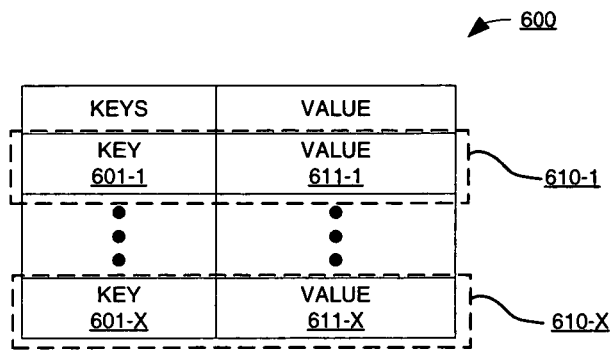
FIG. 6 is a table diagram depicting an exemplary embodiment of a data structure.

FIG. 6 is a table diagram depicting an exemplary embodiment of a data structure 600. Data structure 600 is a so-called "duplicate map"; for example, data structure 600 may be a table of X, for X an integer, (key, value) pairs 610-X, such as key 601-1 and value 611-1, namely, a pair 610-1. Though a table is used herein, any suitable data structure may be used, including, but not limited to, trees, hash tables, and linear lists.

Duplicate map 600 may be used by a netlister to identify when a previously generated HDL object may be reused and to save information to facilitate reuse. In this embodiment, a key 601-X provides means for identification of previous generation of an HDL object, and a value 611-X associated with such a key 601-X provides information used to facilitate reuse.

Figure 7:
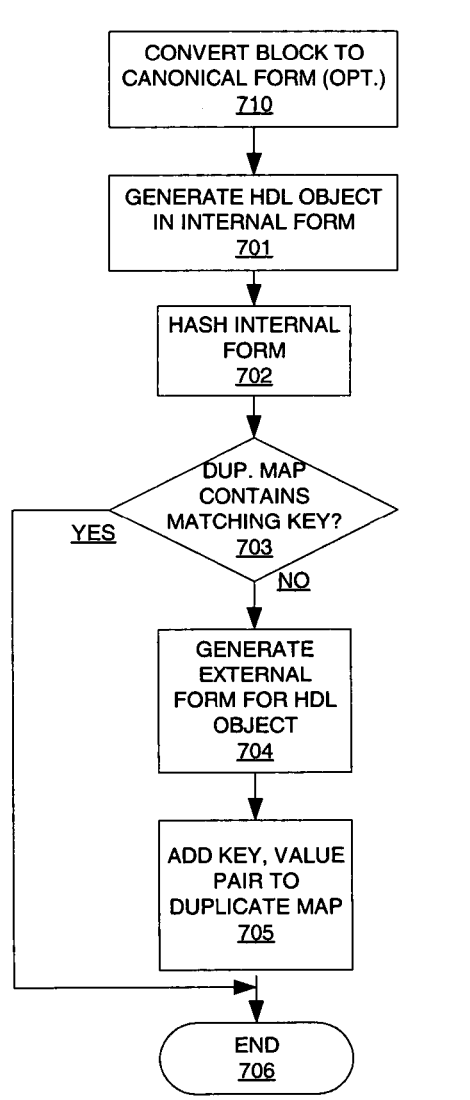
FIG. 7 is a flow diagram depicting an exemplary embodiment of a netlist hashing flow.

FIG. 7 is a flow diagram depicting an exemplary embodiment of a netlister flow 700 to generate an HDL object for a given block. In netlister flow 700, a netlister maintains and updates a duplicate map. The netlister employs the duplicate map to recognize occasions when previously generated HDL objects can be reused, and to keep track of the information needed to allow such reuse.

At 710, a block is converted to a so-called canonical form, i.e., to a standard representation. Such a conversion might involve choosing standard names and orderings for signals and sub-instances. Although choosing standard names and orderings is optional, it may be desirable as it increases the probability that a previously generated HDL object can be used to represent the block. The amount of effort devoted to converting a block to canonical form can vary. For example, at one extreme, if little effort is invested to convert a block into a canonical form, processing time and memory usage is reduced at the expense of overlooking many opportunities for HDL object reuse. At the other extreme, if substantial effort is invested to convert a block into a canonical form, more processing time and memory is needed, but also most opportunities for HDL object reuse are identified, thereby reducing the burden on downstream tools.

At 701, a block is translated into an internal form corresponding to an HDL object to be used to represent the block. The particular internal form may vary. In the System Generator netlister, for example, the internal form is simply the string of text that would be used for the VHDL entity, but with the entity name erased.

At 702, a hash value is constructed from this internal form. The hash value is a string of binary digits that is calculated using a collision resistant hash function. The length string is chosen to reduce the probability of collisions to an acceptable level. For example, in the netlister for Xilinx's System Generator, hash values of 64 bits are employed. In general, hash values of the same or other sizes may be used.

At 703, the hash value from 702 is compared against keys contained in a duplicate map. If the duplicate map does not contain a key that equals the hash value, then, at 704, the HDL object from 701 for the block is translated into an external form. This translation may, for example, be done by writing the HDL object to a file or files. Then, at 705, a new (key, value) pair is added to the duplicate map. The key includes the hash value calculated at 702, and the value includes information needed to use the HDL object just generated. Such information might include a so-called "external view" for the HDL object, such as the names, types, and directions for ports of the HDL object, and the VHDL entity/Verilog module name for the HDL object. If the duplicate map contains a matching key at 703 or if a key, value pair has been added to the duplicate map at 705, then at 706 netlister flow 700 ends.

Note that in the procedure described above two blocks that should be implemented using different HDL objects can accidentally be implemented with the same object. This possibility arises because different internal HDL objects can "collide", i.e., be mapped by the hash function to the same hash value. However, by employing a collision resistant hash function that produces hash values of sufficiently many bits, the probability of a collision can be made arbitrarily close to zero. For example, the netlister in Xilinx's System Generator employs the MD5 hash function to produce 64 bit hash values. In practice this has proven to reduce the probability of collisions to acceptable levels.

Referring again to FIG. 4, client application 410 may provide netlists and other design information 431 for a logic block instantiated design to server computer 420. Server computer 420 may have access to a compilation reduction application 428 corresponding to netlist hashing flow 700 of FIG. 7, which may be in memory 412 of server computer 420. Compile reduction application 428 may populate table 500 in memory 412 of server computer 420. Populated table 500 and netlists from design information 431 may then be provided to software tools 429 for design synthesis. Software tools 429 may include an HLMS, and optionally a compiler for canonical conversion of obtained netlists. Server computer 420 may provide as output a synthesized design 432 to client computer 410.

Accordingly, it should be appreciated that server computer 420 may be configured to reduce compilation time by reuse of previously generated cores and by reducing redundant compiling of equivalent netlists.

Memory 412 may store all or portions of one or more application or data to implement processes in accordance with one or more aspects of the invention. Additionally, those skilled in the art will appreciate that one or more aspects of the invention may be implemented in hardware, software, or a combination of hardware and software. Such implementations may include a number of processors independently executing various programs.

Programmed computers 410 and 420 may be programmed with an operating system, which may be OS/2, Java Virtual Machine, Linux, Solaris, Unix, or Windows operating system, among other known platforms. At least a portion of an operating system may be disposed in memory 412.

Memory 412 may include one or more of the following random access memory, read only memory, magneto-resistive read/write memory, optical read/write memory, cache memory, magnetic read/write memory, and the like, as well as signal-bearing media as described below.

One or more aspects of the invention are implemented as program products for use with one or more of computers 410, 420. Program(s) of the program product defines functions of embodiments in accordance with one or more aspects of the invention and can be contained on a variety of signal-bearing media, such as computer-readable media having code, which include, but are not limited to: (i) information permanently stored on non-writable storage media (e.g., read-only memory devices within a computer such as CD-ROM or DVD-RAM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of one or more aspects of the invention represent embodiments of the invention.

Accordingly, it should be understood that a software tool may be provided that maintains a cache of previously generated components, and recognizes when a component is in such a cache so that the component may be reused. The cache may be made up of sets of files, one set for each component in the cache. By using a collision-resistant hash function, substantially unique names can be assigned to components. A directory-naming scheme based on hash values can be used to store component files in the cache.

It should also be understood that a software tool may be provided that augments a netlister with the capability to maintain and use a duplicate map in which hash values for previously generated components are stored. By checking for a hash value in such a duplicate map, a decision may be made whether to generate a set of files for the component, or to use previously generated files. By using a collision-resistant hash function, the probability of mistakes (i.e., inappropriate reuse of previously generated files) can be made arbitrarily small. While such a tool might employ hash values to construct component names, it is not necessary to do so.

The capabilities of such software tools are independent. An application may employ both, the first without the second, or the second without the first.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A computer-implemented method for component naming, comprising:
   obtaining parameters for a target component, the target component being a circuit core, the parameters being associated with the circuit core, the circuit core defining circuitry performance parameters for performing a mathematical function;
   hashing at least a portion of the parameters to provide a hash value;
   using the hash value to construct a name of the target component;
   storing at least one file for the target component in a directory, the at least one file being stored under the name of the target component;
   selecting another portion of the parameters; and
   appending the other portion selected to the hash value to provide the name for the component naming of the target component.

2. The method, according to claim 1, wherein the using comprises modifying the parameters to include the hash value as at least part of the name of the target component.

3. The method, according to claim 2, further comprising putting the portion of the parameters into a canonical format.

4. The method, according to claim 1, further comprising:
   naming the directory with a directory name, the directory name including the hash value; and
   storing the at least one file for the target component in the directory.

5. The method, according to claim 4, wherein the at least one file is a translation into a hardware description language object of the target component.

6. The method, according to claim 4, wherein the at least one file is a translation into a binary file of the target component.

7. The method, according to claim 1, further comprising:
   naming the directory, the directory named with the name of the target component; and
   storing files including the at least one file for the target component in the directory.

8. The method, according to claim 7, wherein the files are from a translation into a hardware description language object of the target component.

9. The method, according to claim 7, wherein the files are from a translation into a binary file of the target component.

* * * * *